United States Patent
Dupielet et al.

(10) Patent No.: US 10,604,999 B2
(45) Date of Patent: Mar. 31, 2020

(54) ELECTROMECHANICAL ACTUATOR FOR ORIENTING A BLIND AND RANGE OF ELECTROMECHANICAL ACTUATORS

(71) Applicant: SOMFY SAS, Cluses (FR)

(72) Inventors: Norbert Dupielet, Sallanches (FR); Ghislain Measson, Cluses (FR)

(73) Assignee: SOMFY SAS, Cluses (FR)

( * ) Notice: Subject to any disclaimer, the term of this patent is extended or adjusted under 35 U.S.C. 154(b) by 450 days.

(21) Appl. No.: 15/502,275

(22) PCT Filed: Aug. 7, 2015

(86) PCT No.: PCT/EP2015/068278
§ 371 (c)(1),
(2) Date: Feb. 7, 2017

(87) PCT Pub. No.: WO2016/020535
PCT Pub. Date: Feb. 11, 2016

(65) Prior Publication Data
US 2017/0234064 A1    Aug. 17, 2017

(30) Foreign Application Priority Data

Aug. 7, 2014   (FR) ...................................... 14 57686

(51) Int. Cl.
*E06B 9/32*     (2006.01)
*E06B 9/322*    (2006.01)
(Continued)

(52) U.S. Cl.
CPC ........... *E06B 9/322* (2013.01); *F16H 19/001* (2013.01); *F16H 19/06* (2013.01); *E06B 2009/285* (2013.01)

(58) Field of Classification Search
CPC ...... E06B 9/32; E06B 9/322; E06B 2009/285; F16H 19/001; F16H 19/06
See application file for complete search history.

(56) References Cited

U.S. PATENT DOCUMENTS 3,310,099 A * 3/1967 Hunter ...................... E06B 9/32
                                                        160/171
4,644,990 A * 2/1987 Webb, Sr. ................. E06B 9/32
                                                        160/5
(Continued)

FOREIGN PATENT DOCUMENTS

GB         190809877 A   *  1/1909  ............... E06B 9/32

OTHER PUBLICATIONS

International Search Report and Written Opinion dated Nov. 11, 2015 in corresponding International Application No. PCT/EP2015/068278.

*Primary Examiner* — Thomas C Diaz
(74) *Attorney, Agent, or Firm* — Haug Partners LLP

(57) ABSTRACT

An electromechanical orientation actuator (10) for orientating a sunscreen (SCR) with orientable blades (B1, B2, B3; B'1, B'2, B'3) comprises, in series, a motor (11), at least one first speed reduction module (21), a second speed reduction module (31) and a rocker (4) for orienting the blades (B1, B2, B3; B'1, B'2, B'3). The actuator (10) further comprises at least a third speed reduction module (43) in series between the second speed reduction module (31) and the orientation rocker (4). The actuator preferably belongs to a range of actuators further comprising an electromechanical movement actuator (110) for moving a sunscreen (SCR2) that can be moved between a raised position and a lowered position, comprising, in series, a motor (111), at least a first speed reduction module (121) and at least a winder (140) for a suspension cord (L3) of the first screen (SCR2) or for the first screen (SCR2). Notably, the two actuators have a speed reduction module of the same model. For preference, the motor of the first actuator and the motor (11) of the second actuator (10) have identical voltage/current characteristics.

13 Claims, 5 Drawing Sheets

(51) Int. Cl.
*F16H 19/00* (2006.01)
*F16H 19/06* (2006.01)
*E06B 9/28* (2006.01)

(56) References Cited

U.S. PATENT DOCUMENTS

| | | |
|---|---|---|
| 5,444,339 A | 8/1995 | Domel et al. |
| 6,066,062 A * | 5/2000 | Pigozzi .................. F16D 11/10 192/108 |
| 6,536,503 B1 * | 3/2003 | Anderson ............... E06B 9/262 160/170 |

* cited by examiner

ELECTROMECHANICAL ACTUATOR FOR ORIENTING A BLIND AND RANGE OF ELECTROMECHANICAL ACTUATORS

CROSS-REFERENCE TO RELATED APPLICATIONS

This application is the National Stage entry under 35 U.S.C. § 371 of International Application No. PCT/EP2015/068278 filed on Aug. 7, 2015, published on Feb. 11, 2016 under Publication Number WO 2016/020535, which claims the benefit of priority under 35 U.S.C. § 119 of French Patent Application Number 1457686 filed Aug. 7, 2014.

TECHNICAL FIELD OF THE INVENTION

The present invention relates to the field of mobile sun protectors that can be controlled by an electromechanical actuator. It more specifically relates to electromechanical actuators adaptable to raise or lower sun protectors, or to oriented slatted blinds.

BACKGROUND OF THE INVENTION

Certain actuators, hereinafter called orienting actuators, make it possible solely to orient the slats of a blind according to orientation commands supplied by a user through a remote control unit or according to information provided by a sensor. Other types of actuators, subsequently called movement actuators, allow only the upward and downward movement of the set of slats. Lastly, some actuators combine the two aforementioned functions.

The movement actuators have an output member driving a winder intended to rotate over several revolutions to drive the screen between a retracted position and a deployed position, either by winding and unwinding the screen itself, or by winding and unwinding one or several cords fixed to a load bar of the screen (the latter solution in particular being used for Venetian blinds). The number of revolutions between the deployed and retracted end-of-travel positions in particular depends on the distance between the end-of-travel positions and the diameter of the winder, but is generally counted in tens of revolutions. The winding and unwinding speed must be fast enough for the entire operation between the end-of-travel positions not to exceed several tens of seconds.

The orientation actuators have an output member driving a rocker rotating over at least one revolution, and which may include a front arm connected by a front cord to a front part of the slats, and a rear arm connected by a rear cord to a rear part of the slats. Significant precision is then desired over short travels.

The dimensions of the orientation and movement actuators are therefore radically different. However, industrial logic recommends using shared motors for these different actuators. Motors are then chosen with a relatively high rotation speed, which must be considerably reduced for the application to orientation actuators. This need creates a bulk issue that is difficult to reconcile with the size of the boxes used for the blinds.

For orientation blinds, one may also encounter a bulk issue independent of the bulk of the reduction gear associated with the motor. In particular, the available height of the box may vary based on the type of slats: in particular, the boxes for blinds with imitation wood slats are generally shorter than those for wood slats. Likewise, the spacing between the rockers may depend on the type of slats. Wood slats are in fact more rigid than imitation wood slats, and the spacing between the rockers as well as the distance available between the end of the box and the first rocker are thus generally smaller for blinds with slats made from imitation wood than for blinds with wood slats. As a result, the commercially available blinds with imitation wood slats generally do not have motors, the bulk for an actuator being greatly limited by the dimensions of the box and the locations of the rockers.

One solution used in the prior art is to offset the actuator part on the façade, as described in U.S. Pat. No. 5,444,339. This solution is not aesthetically satisfactory.

The alternative consists of using a specific low-speed motor, which is included in the bulk of the box. However, the development costs for such a motor, which is not standard relative to the full line proposed to motorize the different types of blinds or shutters, are high.

BRIEF DESCRIPTION OF THE INVENTION

The invention aims to resolve the drawbacks of the state of the art and improve the control devices of the prior art so as to propose a line of actuators including movement actuators and winding actuators, sharing component elements, without sacrificing the desired compactness.

To that end, a first aspect of the invention proposes an electromechanical orientation actuator for orienting a sunscreen with orientable slats, including, in series, a motor, at least one first speed reduction module, a second speed reduction module and a rocker for orienting the slats, as well as at least a third speed reduction module in series between the second speed reduction module and the orientation rocker.

Providing three production modules makes it possible to use a motor with a high rated speed to drive a rocker over less than one revolution. The three modules further allow an easy adaptation of the actuator to the rotation speed and the required space in the various commercially available blinds boxes. This adaptability is further accentuated if one provides that at least two of the three reduction modules are different models and/or comprise different teeth, or different transmission axes. Thus, two different arrangements of the three reduction modules make it possible to go from an actuator with a somewhat elongated shape having a reduced section, to an actuator with a collected shape, having substantially identical dimensions in terms of width and length. Furthermore, this modular construction of the actuator makes it possible to position the electronic control unit of the motor in different positions depending on the usage cases. The actuator according to the invention has major industrial advantages.

In general, the combination of three speed reduction modules, a fortiori at least two of which are different in terms of model and/or type of teeth, makes it possible to optimize the bulk, the performance and the overall cost of the actuator, relative to solutions of the state of the art.

According to one particularly advantageous embodiment, the first speed reduction module and the second speed reduction module or the second speed reduction module and the third speed reduction module differ in terms of the type of teeth and/or the model of the reduction module.

Preferably, the model of the first speed module, the model of the second speed module and/or the model of the third speed module are chosen from among the following different models.
 parallel teeth with straight pinions
 conical gears, wheel and worm screw,
planetary gears with single teeth,
planetary gears with tumbler gears having double teeth and a sun gear,
magnetic reduction gear,
belt reduction gear,
combinations of the above models.

The teeth may in particular be chosen from among the following types:
Straight teeth,
Helical teeth,
Herringbone teeth.

One of the first, second or third module may in particular be an epicyclic reduction gear with straight teeth, with one or several stages. One feature of an epicyclic reduction gear is the compactness.

One of the first, second and third modules may comprise a planetary gear with one or several stages, at least part of the teeth of which are helical. One of the advantages of helical teeth is noise reduction. To obtain the best silence/cost compromise, it is interesting to place reduction gears with helical teeth near the motor output, where the speed is highest, while using straight teeth when the speed is already greatly reduced.

One of the first, second and third modules can be a gear with two straight pinions. Using gears with straight pinions allows a potential reversal of the transmission direction and an offset of the axis, while reducing speed. The use of straight pinions is known in itself, but the combination with two other types of reduction gears makes it possible to avoid redundancy in this type of reduction gear, to better manage the bulk of the actuator and more relevantly respond to the need in terms of speed reduction rate.

One of the first, second and third modules may comprise a worm mechanism. Using a worm module makes it possible to simultaneously manage an angle transmission and a reduction ratio. This embodiment allows great freedom in the positioning of the motor, in particular perpendicular to the driveshaft of the slats of the blind, in a same plane as that of the driveshaft, but also in a different plane. The motor whose output shaft attacks the worm module can be mounted in the actuator obliquely relative to a housing bottom that will be mounted parallel to the bottom of the box, thus reducing the axial bulk and using the space in the height of the box. Using a speed reduction module with a worm also makes it possible to obtain an irreversibility of the actuator. This may make it possible to do away with a mechanical brake in the actuator. The fairly mediocre output of this reduction module has little impact in the context of an actuator solely for rotating the slats of the blind and inasmuch as it is not necessary to build several reduction stages of the same model. However, the high reduction ratio and the low operating noise are important assets.

Preferably, the orientation rocker rotates around a rotation axis that is not coaxial with a rotation axis of the motor. In practice, an orientation blind is equipped with several rockers, two, three or more depending on the width of the blind. The actuator for rotating the slats can be placed either at the end of the box, inside the box but outside the rockers, or at the center of the device between the rockers. This last position is less advantageous, since it is more complex to install and requires modifying the shaft or removing it to install the actuator. However, it offers greater design freedom of the actuator, since the available bulk is greater, in particular in terms of length. In all cases, it is difficult to mount the actuator in the extension of the driveshaft without modifying the structure of the blind, hence the interest in providing that the drive shaft and the output shaft are not coaxial. This is done using one of the reduction modules, the other two modules being placed, depending on the desired versions, either upstream or downstream from the module creating the misalignment. Thus, through the bias of one of the reduction modules, the arrangement of the components of the actuator is defined based on the desired bulk, while preserving the speed reduction effect necessary for the requested application.

According to one embodiment, the rotation axis of the rocker is parallel to the rotation axis of the motor. In this configuration, the actuator is suitable for being housed in the length of the box, at least one of the speed reduction modules having a rather elongated shape and being arranged parallel to the motor. Advantageously, the elongated speed reduction module is housed along an axis parallel, and not coaxial, to the axis of the motor.

Alternatively, the rotation axis of the rocker is perpendicular to the rotation axis of the motor. In this configuration, the motor is suitable for being housed in the width of the box. The reduction of the longitudinal bulk of the actuator makes it possible to house the latter at the end of the box, such that the output of the actuator directly attacks the end of the driveshaft. Mounting the actuator with the driveshaft is thus easier.

According to one embodiment, the actuator comprises a box in which the motor and the speed reduction modules are housed. Advantageously, an electronic control unit is also comprised inside the box and the electronic unit comprises an electronic circuit preferably extending along a direction parallel or perpendicular to a rotation axis of the motor. The electronic control unit is advantageously housed in the housing of the actuator, in the bulk left free by the set of mechanical components of the driving actuator and speed reduction modules in light of the space available in the box. The electronic unit may thus be housed parallel and coaxial to the driveshaft, when the actuator has a rather elongated shape. Alternatively, when the actuator has a collected shape, having substantially identical width, length dimensions, the electronic unit can be housed parallel or perpendicular to the driveshaft. Alternatively, the electronic unit is housed outside the housing, and connected to the motor by a flexible wired connection. In particular, the electronic unit can be housed in one of the rod ends of the box.

According to one embodiment, the box comprises an opening receiving a driveshaft, the third speed reduction module comprising an interface part intended to be connected to the driveshaft, the interface part being housed inside the housing of the actuator without protruding outside the housing. In the particular case where the actuator is elongated, the interface with the driveshaft can be made at the actuator end. However, it is also possible to provide a construction in which, although the succession of speed reduction modules and the motor primarily follows a same axis, the associated housing has a width substantially equal to that of the box, thus covering the available longitudinal and transverse space, in particular to house the electronic unit therein. In this case, the interface between the output of the actuator and the driveshaft must preferably be made inside the box. The insertion of the driveshaft on the output of the actuator is then done blindly inside the housing.

According to another aspect, the invention pertains to motorized screen equipment including a Venetian blind with orientable slats connected to at least a front orientation cord and a rear orientation cord, and an electromechanical orientation actuator as previously described, the rocker of which is associated with the front orientation cord and the rear orientation cord.

According to another aspect, the invention relates to an electromechanical orientation actuator for orienting a sunscreen with orientable slats, including, in series, a motor, at least one first speed reduction module, a second speed reduction module and a rocker for orienting the slats, the rotation axis of the rocker being perpendicular to the rotation axis of the motor. The first module and the second module can advantageously be different in terms of model and/or type of teeth, which makes it possible to optimize the bulk, the performance and the overall cost of the actuator, relative to solutions of the state of the art. Naturally, the actuator can also comprise a third speed reduction module in series between the second speed reduction module and the orientation rocker.

According to another aspect, the invention relates to a line of electromechanical actuators for sunscreens, including at least:
- a first electromechanical actuator for moving a first sunscreen movable between a high position and a low position, including, in series, a motor, at least one first speed reduction module and at least one winder for a suspension cord L of the first screen or for the first screen;
- a second electromechanical orientation actuator for a second sunscreen with orientable slats, as previously described.

Remarkably, the first speed reduction module of the first actuator and one of the speed reduction modules of the second actuator have the same model and identical transmission ratios.

The motor and the first reduction module can form a shared structural unit.

According to one embodiment, the motor of the first actuator and the motor of the second actuator have identical current/voltage characteristics. The first speed reduction module is therefore dimensioned such that, in combination with the motor, it produces the desired speed reduction ratio for the application to a movement actuator.

Naturally, the actuator line may comprise more than two movement actuators with motors having identical current/voltage characteristics, but with speed reduction modules having different speed ratios, or different models or teeth from among the modules previously described.

Likewise, the actuator line may comprise more than two orientation actuators with motors having identical current/voltage characteristics, but with speed reduction modules having different speed ratios, or different models or teeth from among the modules previously described.

According to another aspect, the invention relates to a line of electromechanical actuators for sunscreens, including at least:
- a first electromechanical actuator for moving a first sunscreen movable between a high position and a low position, including, in series, a motor, at least one first speed reduction module and at least one winder for a suspension cord of the first screen or for the first screen;
- a second electromechanical orientation actuator for orienting a second sunscreen with orientable slats, including, in series, a motor, at least one first speed reduction module, a second speed reduction module, a third speed reduction module, and a rocker for orienting the slats, the motor of the first actuator and the motor of the second actuator having identical current/voltage characteristics.

Preferably, the first speed reduction module of the first actuator and one of the speed reduction modules of the second actuator are of the same model and have identical transmission ratios. The rotation axis of the rocker may be parallel or perpendicular to the rotation axis of the motor.

According to another aspect, the invention relates to a line of motor-driven screen equipment, including:
- motorized screen equipment including a Venetian blind with orientable slats connected to at least a front orientation cord and a rear orientation cord, and an electromechanical orientation actuator as previously described, the rocker of which is associated with the front orientation cord and the rear orientation cord;
- retractable motorized screen equipment, including a retractable screen and an electromechanical movement actuator as previously described, the winder of which is associated with the screen or with a retraction cord of the retractable screen, secured to a load bar of the retractable screen, the electromechanical orientation actuator and the electromechanical movement actuator belonging to a same line of actuators within the previously defined meaning.

According to another aspect, the invention relates to a line of electromechanical actuators for sunscreens, including at least:
- a first electromechanical actuator for moving a first sunscreen movable between a high position and a low position, including, in series, a motor, at least one first speed reduction module and at least one winder for a suspension cord of the first screen or for the first screen;
- a second electromechanical orientation actuator for orienting a second sunscreen with orientable slats, including, in series, a motor, at least one first speed reduction module, a second speed reduction module and a rocker for orienting the slats, the rocker having a rotation axis perpendicular to the rotation axis of the motor.

The first speed reduction module of the first actuator and one of the speed reduction modules of the second actuator preferably are of the same model and have identical transmission ratios. The motor of the first actuator and the motor of the second actuator preferably have identical current/voltage characteristics.

In alternatives, the invention is intended to include all combinations between the aspects or embodiments of the invention mentioned above.

BRIEF DESCRIPTION OF THE FIGURES

Other features and advantages of the invention will emerge from reading the following description, in reference to the appended figures, which illustrate.

For greater clarity, identical elements are identified using identical reference signs in all of the figures.

DETAILED DESCRIPTION OF THE INVENTION

Figure 1:
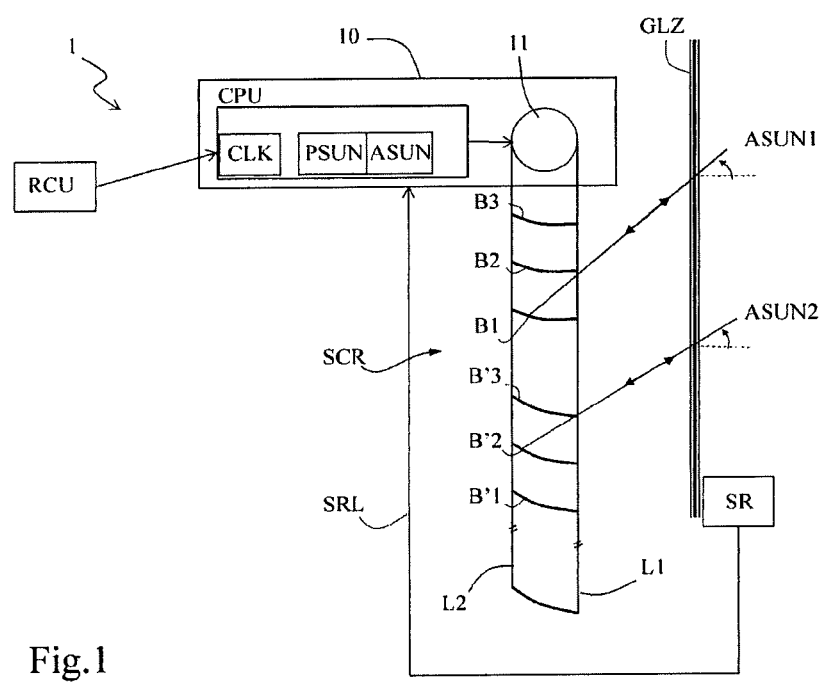
FIG. 1, a diagram of sunscreen equipment according to the invention.

FIG. 1 diagrammatically shows home automation equipment 1 for a motorized screen according to the invention.

The equipment 1 comprises a sunscreen SCR made up of horizontal slats B1, B2, B3 (or B'1, B'2, B'3) whose orientation is guided by cords in the form of ladders L1 and L2 connected to an electromechanical actuator 10 provided with a motor 11.

The screen SCR is arranged behind a façade window pane GLZ, on a site situated inside a building. Alternatively, the screen may be arranged in front of the window pane, outside the building, or between two window panes.

The figure partially shows the screen in two different orientations, obtained by the action of the actuator 10. The orientation of the slats can be obtained manually, according to an order given by a user bearing a remote control RCU or automatically, for example based on an incidence angle ASUN1 or ASUN2 of the direct solar radiation.

At the very bottom of the screen, a slat is shown with any incline. The upper part of the screen shows three slats B1-B3, with a first incline. The lower part of the screen next shows three slats B'1-B'3, with a second particular incline. The three slats B'1-B'3 are for example the preceding slats B1-B3, shown in a different angular position.

The direct solar radiation reaches the upper faces of the slats or portions of the upper faces of the slats. Depending on the surface condition of the slat, the incline thereof and the incidence zone, the radiation is reflected toward the window pane, the inside of the room or the upper slat. The reflected rays are not shown in the figures.

In order to orient the slats, the installation additionally comprises an electronic control unit CPU, a remote control unit RCU, able to be activated by the user occupying the premises. The order received by the electronic control unit CPU is processed and makes it possible to activate the orientation motor 11 of the slats in one direction or the other. The detail of the kinematic chain is shown in the following figures. The control unit comprises software means for governing the operation of the installation. In particular, these software means comprise computer programs.

Furthermore, the equipment may comprise a sensor SR, connected to the control unit by a wired or wireless link SRL. The information provided by the sensor SR makes it possible to develop at least two pieces of information in the control unit CPU on the state of the solar radiation. A first piece of information PSUN translates the presence of direct solar radiation on the window pane GLZ. A second piece of information ASUN translates a primary incidence direction (or height) of this direct solar radiation.

Through the remote control unit, the sensor SR and an astronomical clock CLK, the control unit CPU can thus control the positioning, in particular the orientation, of the slats to satisfy an automatic and/or manual operation.

The electromechanical actuator 10 making it possible to perform the mechanical orientation of the slats of the blind must interface with a rotational drive shaft 3 on which rockers 4 are mounted driving the cords L1 and L2. In particular, the output of the actuator is formed by a hole whose section corresponds to that of the driveshaft of the blind, and making it possible to accommodate a section or an end of the driveshaft. The driveshaft 3 and the rockers 4 are mounted in a rail 2 that is part of a box through supports 5, 6.

The actuator 10 must also, like the driveshaft and the rockers, preferably be housed inside the rail 2, so as to be invisible from the outside. The rails for blinds with horizontal slats also are U-shaped with a flat bottom, the free ends of the U being curved on themselves to stiffen the rail. For aesthetic reasons, these rails are as small as possible, which raises integration constraints for the actuator.

Figure 2:
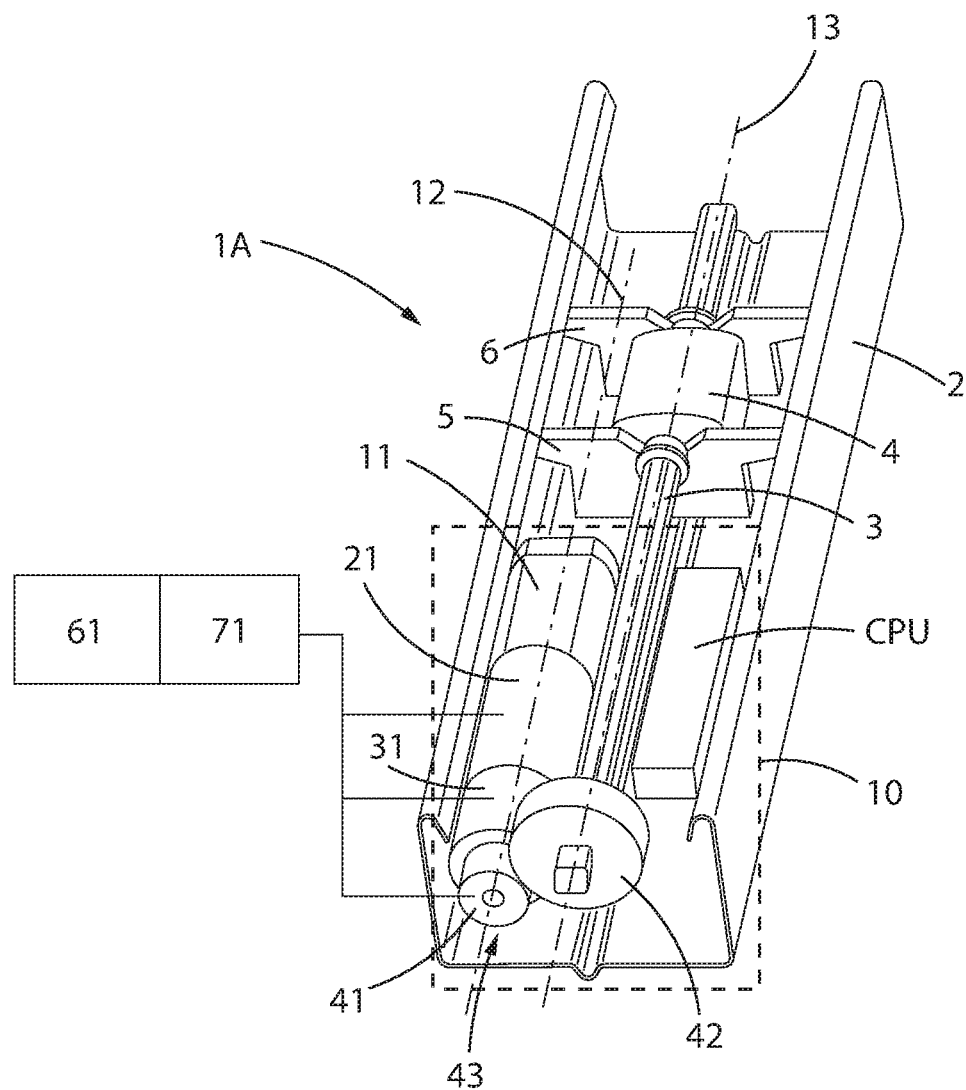
FIG. 2, an orientation actuator according to a first embodiment of the invention, mounted in a blind rail.

According to a first embodiment shown in FIG. 2, the actuator 10 extends primarily parallel to the driveshaft 3. Along a first rotation axis 12 of the motor, one successively finds the motor 11, a first epicyclic speed reduction module 21, a second epicyclic speed reduction module 31 and a first gear wheel 41. Along a second so-called driving axis 13, there is a second gear wheel 42, with a different diameter and number of teeth from the first gear wheel 41. The first 41 and second 42 gear wheels cooperate to form a transmission module 43 with a dual objective: changing axis and reduction stage. The second axis 13 is aligned with the driveshaft 3. Each module 21, 31, 43 are of a particular model 61 and each have a type of teeth 71.

Thus, the actuator 10 according to this first embodiment partially assumes a primarily elongated form with a reduced section, which makes it possible to house it parallel to the driveshaft 3 at the center of the device between the rockers 4.

Figure 3:
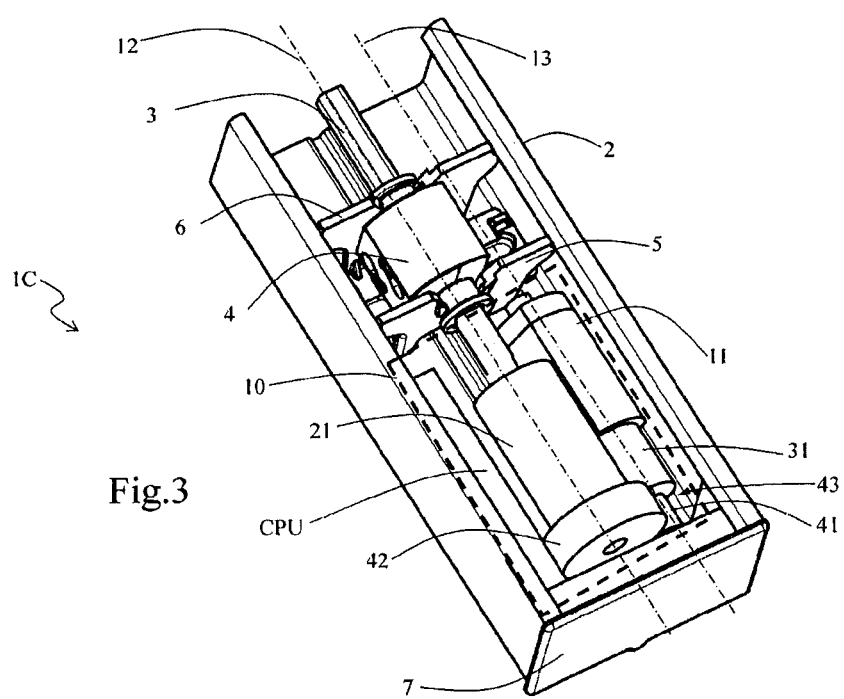
FIG. 3, an orientation actuator according to a second embodiment of the invention, mounted in a blind rail.

According to a second embodiment illustrated in FIG. 3, the total length of the actuator 10 is as small as possible. To address the same speed constraints as the first embodiment, the motor 11 and the reduction module 21, 31 are the same, but arranged differently. Thus, along a first axis 12, one successively finds the motor 11, the first epicyclic speed reduction module 21, and the first gear wheel 41. Along a second axis 13, one successively finds the second gear wheel 42 forming, with the first gear wheel 41, the axis-changing speed reduction module 43, and the second epicyclic speed reduction module 31.

The actuator 10 according to this second embodiment has a more collected shape, but it can be housed partly parallel to the drive shaft 13 and interface directly with a free end of the driveshaft 3. It is arranged outside the rockers 4, between a cover 7 closing the box 2 mounted at the rail end and the adjacent rocker 4.

Figure 4:
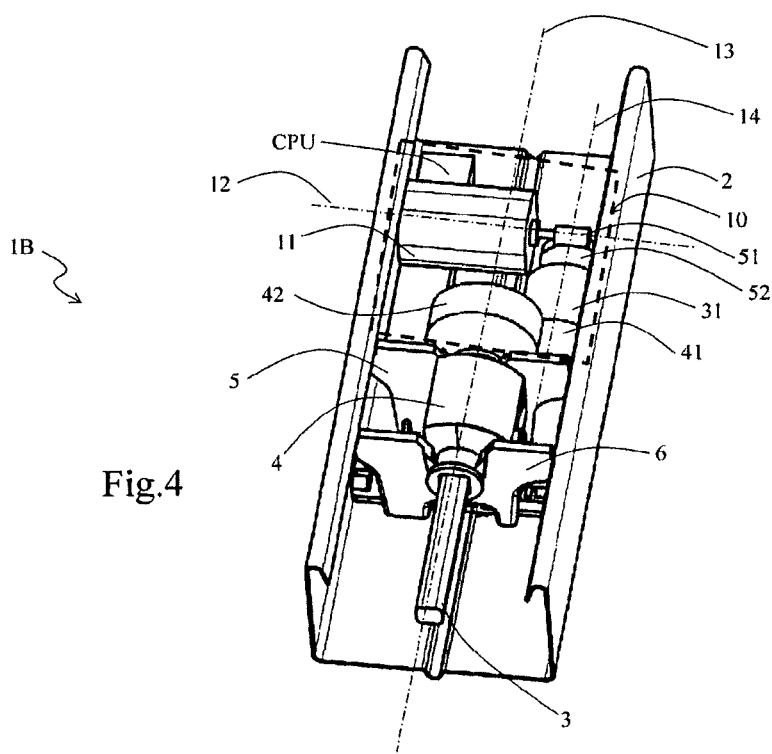
FIG. 4, an orientation actuator according to a third embodiment of the invention, mounted in a blind rail.

A third embodiment illustrated in FIG. 4 differs from the first two by the motor 11 and certain speed reduction modules. The motor is installed along a first axis 12, perpendicular to the driving axis 13. The motor 11 can be similar to that of the preceding embodiments, but the arrangement of the motor 11 perpendicular to the rail imposes a new length constraint. If needed, another type of motor may be chosen. The motor 11 and a worm screw 51 therefore follow one another along this first axis 12. Along a fourth axis, or intermediate axis 14, one successively finds a third gear wheel 52, the second epicyclic speed reduction module 31, and the first gear wheel 41. Along a second axis 13, parallel to the fourth axis, is the second gear wheel 42, with a different diameter and number of teeth from the first gear wheel 41. The first and second gear wheels cooperate to form a transmission device 43 or axis-changing and reduction stage device. The worm screw 51 and the second gear wheel 52 also cooperate to form a so-called "worm screw" speed reduction module 53 serving a dual purpose: angle (or axis-changing) transmission and speed reduction stage.

In this speed reduction mode, the motor 11 can also be mounted obliquely (not parallel to the bottom of the box). This makes it possible to free space below part of the motor to slide the electronic board CPU therein and/or optionally to save several millimeters in motor size.

In each of these embodiments, the interest lies in using a motor working between 5,000 and 12,000 revolutions/minute, or more than 15,000 RPM, which are the most common on the market and therefore make it possible to save on costs, particularly inasmuch as they are also used in other types of actuators, for example to motorize Venetian blinds with moving slats, Roman blinds, pleated blinds, or honeycomb blinds with driving of the raising cords, roller blinds (a canvas winding around a winding tube rotated by the actuator).

The motors having such output speeds must be coupled with reduction modules making it possible to obtain very low speeds as output, of about 15 revolutions/minute.

An epicyclic speed reduction module may comprise one or several reduction stages. Each stage may be of type I (single-toothing tumbler gear) or II (double-toothing tumbler gear).

Figure 5:
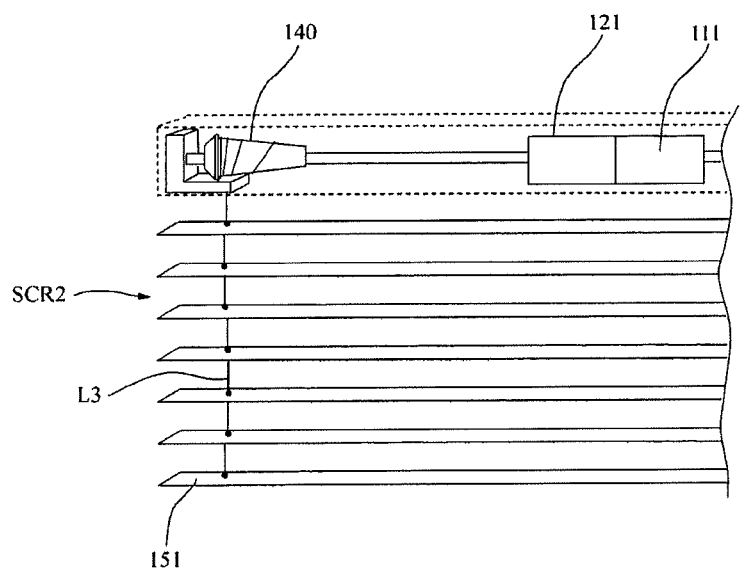
FIG. 5, a movement actuator belonging to a line of actuators with one of the preceding orientation actuators.

FIG. 5 shows an electromechanical movement actuator 110 completing the line of actuators. This actuator 110, intended to drive a sunscreen SCR2 movable between a high position and a low position, includes, in series, a motor 111, at least one first speed reduction module 121 and at least one winder 140 for a suspension cord L3 of the screen SCR2 fastened to a lower slat making up the load bar. The speed reduction module 121 is of the same model as one of the speed reduction modules 21, 31, 43 of one of the preceding orientation actuators and preferably has a transmission ratio identical to at least one of the speed reduction modules 21, 41, 43. If applicable, the motor 111 can also be identical to the motor 1 of one of the preceding orientation actuators, and in particular have a current/voltage characteristic identical to that of one of the orientation actuators.

Of course, various alternatives are possible, as discussed in the description of the invention.

The invention claimed is:

1. An electromechanical orientation actuator for orienting a sunscreen with orientable slats, comprising, in series:
   a motor,
   at least one first speed reduction module,
   a second speed reduction module,
   at least One third speed reduction module; and
   a rocker for orienting the slats,
   wherein the first speed reduction module and the second speed reduction module or the second speed reduction module and the third speed reduction module differ in terms of the type of teeth and/or the model of the reduction module, such that alternating speed reduction modules differ in terms of the type of teeth and/or the model or the reduction module,
   wherein the model of the first speed module, the model of the second speed module, and/or the model of the third speed module are selected from a group consisting of the following different models:
   parallel teeth with straight pinions,
   conical gears,
   wheel and worm screw,
   planetary gears with single teeth,
   planetary gears with tumbler gears having double teeth and a sun gear,
   magnetic reduction gear,
   belt reduction gear, and
   combinations of the above models.

2. The electromechanical actuator according to claim 1, wherein the type of teeth is selected from the group consisting of:
   Straight teeth,
   Helical teeth, and
   Herringbone teeth.

3. The electromechanical actuator according to claim 1, wherein the rocker rotates around a rotation axis that is not coaxial with a rotation axis of the motor.

4. The electromechanical actuator according to claim 3, wherein the rotation axis of the rocker is parallel to the rotation axis of the motor.

5. The electromechanical actuator according to claim 3, wherein the rotation axis of the rocker is perpendicular to the rotation axis of the motor.

6. The electromechanical actuator according to claim 1, further comprising:
   a box in which the motor and the speed reduction modules are housed.

7. The electromechanical actuator according to claim 6, further comprising:
   an electronic control unit inside the box, and
   wherein the electronic control unit comprises an electronic circuit extending along a direction parallel or perpendicular to a rotation axis of the motor.

8. The electromechanical orientation actuator according to claim 6,
   wherein the box comprises an opening for receiving a driveshaft,
   wherein the third speed reduction module comprising an interface part configured to be connected to the driveshaft, and
   wherein the interface part is housed inside a housing of the actuator without protruding outside the actuator housing.

9. A line of electromechanical actuators for sunscreens, comprising:
   a first electromechanical actuator for moving a first sunscreen, movable between a high position and a low position, comprising, in series:
   a motor,
   at least one first speed reduction module, and
   at least one winder for a suspension cord of the first screen or for the first screen;
   a second electromechanical orientation actuator for a second sunscreen with orientable slats, according to claim 1;
   wherein the first speed reduction module of the first actuator and one of the speed reduction modules of the second actuator have a same model and identical transmission ratios.

10. The line of actuators according to claim 9, wherein the motor of the first actuator and the motor of the second actuator have identical current/voltage characteristics.

11. The electromechanical orientation actuator according to claim 7,
   wherein the box comprises an opening for receiving a driveshaft,
   wherein the third speed reduction module comprising an interface part configured to be connected to the driveshaft, and
   wherein the interface part is housed inside a housing of the actuator without protruding outside the actuator housing.

12. The electromechanical actuator according to claim 1, wherein the orientation rocker rotates around a rotation axis that is not coaxial with a rotation axis of the motor.

13. The electromechanical actuator according to claim 2, wherein the orientation rocker rotates around a rotation axis that is not coaxial with a rotation axis of the motor.

* * * * *